ic acid in the form of a lithium salt thereof, with a pH value of between 6 and 8, and at least one complexing agent for the higher valence stage of polyvalent heavy metal ions and/or an alkali azide, are remarkably stable and useful in the quantitative determination of uric acid in enzymatic and chemical processes.

United States Patent [19]
Scheibe et al.

[11] 3,920,400
[45] Nov. 18, 1975

[54] URIC ACID STANDARD SOLUTION

[75] Inventors: Peter Scheibe; Erich Bernt, both of Munich; Wolfgang Gruber, Tutzing, Upper Bavaria, all of Germany

[73] Assignee: Boehringer Mannheim GmbH, Mannheim-Waldhof, Germany

[22] Filed: Feb. 5, 1974

[21] Appl. No.: 439,819

[30] Foreign Application Priority Data
Feb. 13, 1973 Germany............................ 2307052

[52] U.S. Cl................ 23/230 B; 252/408; 252/397; 424/DIG. 6; 195/103.5 R
[51] Int. Cl.²................... G01N 31/06; C09K 15/20; C09K 15/12; C09K 15/06
[58] Field of Search............ 252/408, 397; 23/230 B; 424/DIG. 6; 195/103.5 R

[56] References Cited
UNITED STATES PATENTS

| | | | |
|---|---|---|---|
| 2,506,492 | 7/1946 | DeMytt et al.............. | 424/DIG. 6 X |
| 3,349,000 | 6/1963 | Albaum......................... | 23/230 B X |

*Primary Examiner*—Benjamin R. Padgett
*Assistant Examiner*—David Leland
*Attorney, Agent, or Firm*—Burgess, Dinklage & Sprung

[57] ABSTRACT

Uric acid standard composition comprising an aqueous buffered solution of uric acid in the form of a lithium salt thereof, with a pH value of between 6 and 8, and at least one complexing agent for the higher valence stage of polyvalent heavy metal ions and/or an alkali azide, are remarkably stable and useful in the quantitative determination of uric acid in enzymatic and chemical processes.

17 Claims, No Drawings

URIC ACID STANDARD SOLUTION

The invention relates to a uric acid standard in the form of an aqueous uric acid solution containing a definite and stable amount of uric acid.

A number of enzymatic and chemical processes for the quantitative determination of uric acid in a variety of substances, particularly in biological fluids, are known. In these processes it is nearly always necessary to include in the measurements uric acid solutions having a definite, known content of uric acid as a standard in evaluating the findings. For this purpose, aqueous uric acid solutions are used which have a definite uric acid content and which are referred to as uric acid standards, and they commonly contain the uric acid in the form of its lithium salt, since this is characterized by particularly good solubility characteristics and therefore makes it possible to prepare uric acid standards having a relatively high uric acid content such as is desired for these purposes. Such uric acid standards ordinarily contain also a buffer which adjusts the pH to a valve between 6 and 8, because otherwise the highly alkaline lithium salt creates the danger of a hydrolytic cleavage of the uric acid.

It has been found, however, that the previously known standards have the serious disadvantage that their uric acid content changes rapidly, and the uric acid content of such solutions diminishes markedly within hours and, after several days, it often happens that no uric acid at all can be detected in them. Since it is apparent that an absolutely constant uric acid content is important in a uric acid standard, it has therefore been necessary to prepare the uric acid standard solution freshly before each use, and this represents a considerable disadvantage in the conventional methods for the determination of uric acid.

There has been a need to find the reason for the uric acid losses and to create a means of eliminating such losses.

It has now surprisingly been found that the above-described uric acid losses are due to a catalytic decomposition of uric acid, which is brought about by the presence of ions of polyvalent heavy metals in their higher valence stages. In particular, iron(III)ions and arsenic(V)ions, which are included among the heavy metals ions in the framework of the present invention, have proven to be especially effective catalysts for the uric acid decomposition. The decomposition may be prevented by lowering the redox potential of the higher valence stages of such metal ions, which cannot be excluded as impurities.

The invention comprises a uric acid standard, consisting of an aqueous buffered solution of uric acid in the form of its lithium salt, having a pH between 6 and 8, and containing at least one complexing agent for the higher valence stage of polyvalent heavy metal ions and/or alkali azide.

It has been found surprisingly that alkali azide is capable of preventing the catalytic decomposition of uric acid. This was not to be expected because, due to its preserving action, azide is effective as a stabilizing agent only in those cases in which a bacterial decomposition has to be prevented, such as that which occurs in substances and solutions which contain bacterial nutrients. In the instant invention there is a novel action mechanism of alkali azide, especially lithium and sodium azide, and this is apparent from the fact that other preserving agents, which otherwise are capable of stabilizing against undesirable bacterial growth in the same manner as azide, are completely ineffectual in a uric acid standard solution.

To show that the decomposition of uric acid in aqueous solution is due to the higher valence stages of polyvalent heavy metal ions and that this phenomenon can be eliminated in accordance with the invention, the following table presents the results of experiments which have been performed with aqueous solutions of uric acid. The table gives the percentage content of uric acid found in the solution at the end of one week at room temperature. In Experiment 1 a pure aqueous solution of uric acid was used, in which it was made certain that no traces of metal (e.g., from the glass or from the water, etc.) had gotten into the solution. The concentration was 0.12 mM on account of the low solubility.

To Solution 2 there was added 2 $\mu$M $Fe^{3+}$, and to Solution 3 the same was added plus 1.5 mM of azide. Solution 4 was the same as Solution 2, but it contained 50 mM of phosphate ions; Solution 5 contained the same plus azide in the stated amount. Solution 6 was the same as Solution 2, but additionally contained about 1 $\mu$M of $As^{5+}$. Solution 7 was the same as Solution 6, but contained azide. Solutions 8 and 9 were the same as Solution 4, but contained as known preservatives 9 mM of sorbic acid and 8 mM of benzoic acid, respectively. Solutions 2 to 9 contained 0.71 mM of uric acid.

In the following text "uric acid" is designated by HS.

| Solution No. | Composition | Uric acid content in % after 1 week |
|---|---|---|
| 1 | HS solution | 100 |
| 2 | HS solution $Fe^{3+}$ | 90 |
| 3 | HS solution $Fe^{3+}$ $NaN_3$ | 100 |
| 4 | HS solution $Fe^{3+}$ $PO_4^{3-}$ | 0 |
| 5 | HS solution $Fe^{3+}$ $PO_4^{3-}$ $NaN_3$ | 100 |
| 6 | HS solution $Fe^{3+}$ $As^{5+}$ | 0 |
| 7 | HS solution $Fe^{3+}$ $As^{5+}$ $NaN_3$ | 100 |
| 8 | HS solution $Fe^{3+}$ $PO_4^{3-}$ Sorbic acid | 0 |
| 9 | HS solution $Fe^{3+}$ $PO_4^{3-}$ Benzoic acid | 0 |

In connection with the experiments described above, it is to be noted that Solution No. 1 is not usable in practice on account of excessively low uric acid concentration and expensive manufacture. To obtain a sufficient concentration, the solubility must be improved through the addition of other substances, such as lithium carbonate, in which case it is inevitable that small amounts of the catalytically acting metal ions will get into the solution. The same action which has been demonstrated in the above table for azide is to be attributed to those complexing agents which complex exclusively or predominantly the higher valence stage of the polyvalent heavy metal and arsenic ions, such as malonic acid, salicylic acid, 8-oxyquinoline, ethyl mercury (II) thiosalicylate, oxalic acid, cysteine, reduced glutathion, EDTA, ethyl mercury thiobenzoate, p-(ethylmercury(II)mercapto)-benzenesulfonate, ethylmercury(II)thiobenzene-3,4-oxazyl-1-carboxylic(II)acid-(II)sodium, etc.

The amount of complexing agent or alkali azide to be added in accordance with the invention depends on the amount of catalytically decomposing ions present in the solution. The quantity of these ions is usually very small, and it is for this reason that their catalytic action had not previously been discovered. Usually, therefore, the addition of between 0.01 and 1 mg of complexing agent or azide per 100 ml of uric acid solution will suffice. Depending on the circumstances involved, e.g., the extent to which heavy metal ions dissolve out of the glass apparatus and vessels coming in contact with the uric acid standard, the addition of larger or smaller amounts may be desirable.

A uric acid standard in accordance with the invention usually contains between 1 and 15 mg of uric acid per 100 ml of solution, preferably 2 to 12 mg per 100 ml, corresponding to 0.12 to 0.71 mM. The uric acid is in the form of its lithium salt. Lithiumcarbonate in an excess about the amount required for the formation of the salt with the uric acid. Preferred is lithium carbonate in an amount between 0.3 and 1.0 mM.

The pH of the uric acid standard is adjusted to between 6.0 and 8.0, preferably 6.5 to 7.0, by the addition of a suitable buffer. Suitable buffer concentrations range, for example, between about 10 and about 200 mM. Examples of buffers which are effective in the above-stated pH range are phosphate buffer, which is preferred, imidazole buffer, triethanolamine buffer and tris buffer.

The uric acid standard of the invention makes it possible both in the enzymatic and in the chemical method of uric acid determination to use not only the uric acid determining reagents in the form of a stable solution as in the past, but also the uric acid standard in the form of a stable solution. This signifies a considerable simplification and a reduction in the number of procedural steps required for the performance of the determinations, and improves the reliability of uric acid determination.

The following examples illustrate, without limitation, the invention.

EXAMPLE 1

Preparation of the Uric Acid Standard 720.0 mg of uric acid (NBS quality, MBS = National Bureau of Standards) was completely dissolved with 500 ml of lithium carbonate solution (400 mg $Li_2CO_3$/500 ml) with stirring. After dilution of this solution with about 8.0 liters of twice-distilled water, 50.0 g of disodium hydrogen phosphate, 30.0 g of sodium dihydrogen phosphate · $1H_2O$ and 1.2 g of sodium azide were weighed out and added thereto. Twice-distilled water was added to bring the solution up to precisely 12.0 liters and, after careful stirring, it was poured through a G-3 frit filter into containers holding 12.0 ml each. The pH of the solution is 6.5 to 7.0.

The uric acid standard thus obtained is found to have an unchanged uric acid content after weeks of storage at room temperature.

EXAMPLE 2

Preparation of the Uric Acid Standard 360.0 mg of uric acid (NBS quality, NBS = National Bureau of Standards) was completely dissolved by stirring in 250 ml of lithium carbonate solution (400 mg $Li_2CO_3$/500 ml). After this solution had been diluted with approximately 8.0 l of twice-distilled water, 50.0 g of disodium hydrogen phosphate, 30.0 g of sodium dihydrogen phosphate · $1 H_2O$ and 2.4 g of ethylmercury(II)thiosalicylate were weighed out and added. Twice-distilled water was added to bring the solution to precisely 12.0 liters and, after careful stirring, it was poured through a G-3 frit filter into containers holding 12.0 ml each. The pH of the solution is 6.5 to 7.0.

EXAMPLE 3

Preparation of the Uric Acid Standard 1.200 g of uric acid (NBS quality, NBS = National Bureau of Standards) was completely dissolved by stirring in 1500 ml of lithium carbonate solution (400 mg $Li_2CO_3$ per 500 ml). After this solution had been diluted with approximately 8.0 l of twice-distilled water, 50.0 g of disodium hydrogen phosphate, 30.0 g of sodium dihydrogen phosphate · $1 H_2O$ and 1.6 g of oxalate were weighed out and added. Twice-distilled water was added to bring the solution to precisely 12.0 liters and the solution was carefully stirred and poured through a G-3 frit filter into containers holding 12.0 ml each. The pH of the solution amounts to 6.5 to 7.0.

The uric acid standard thus obtained had an unchanged uric acid content after weeks of storage at room temperature.

EXAMPLE 4 -

Preparation of the Uric Acid Standard 1.44 g of uric acid (NBS quality) was completely dissolved by stirring in 1500 ml of lithium carbonate solution (400 mg $Li_2CO_3$ per 500 ml). After this solution had been diluted with approximately 8.0 liters of twice-distilled water, 50.0 g of disodium hydrogen phosphate, 30.0 g of sodium dihydrogen. $1 H_2O$ and 2.4 g of sodium azide and 1.2 g of p-(ethylmercury(II)-mercapto)-benzenesulfonic acid sodium were weighed out and added. Twice-distilled water was added to bring the solution to precisely 12.0 liters and the solution was carefully stirred and poured through a G-3 frit filter into containers holding 12.0 ml each. The pH of the solution is 6.5 to 7.0.

The uric acid standard thus obtained has an unchanged uric acid content after weeks of storage at room temperature.

It will be understood that the specification and examples are illustrative but not limitative of the present invention and that other embodiments within the spirit and scope of the invention will suggest themselves to those skilled in the art.

What is claimed is:

1. Uric acid standard composition comprising an aqueous, buffered solution of uric acid in the form of the lithium salt with a pH value between 6 and 8 and at least one complexing agent for the higher valence stage of polyvalent heavy metal ions.

2. Uric acid standard composition comprising an aqueous, buffered solution of uric acid in the form of the lithium salt with a pH value between 6 and 8 and at least one alkali metal azide.

3. Uric acid standard composition as claimed in claim 1 wherein said pH value is from 6.5 to 7.0.

4. Uric acid standard composition as claimed in claim 1 wherein said complexing agent is malonic acid.

5. Uric acid standard composition as claimed in claim 1 wherein said complexing agent is salicylic acid.

6. Uric acid standard composition as claimed in claim 1 wherein said complexing agent is oxalic acid.

7. Uric acid standard composition as claimed in claim 1 wherein said complexing agent is cysteine.

8. Uric acid standard composition as claimed in claim 1 wherein said complexing agent is reduced glutathione.

9. uric acid standard composition as claimed in claim 1 wherein said complexing agent is EDTA.

10. Uric acid standard composition as claimed in claim 1 wherein said complexing agent is 8-oxyquinoline.

11. Uric acid standard composition as claimed in claim 1 wherein said complexing agent is ethylmercury(II)thiosalicylate.

12. uric acid standard composition as claimed in claim 1 wherein said complexing agent is one of ethylmercury(II)thiobenzoate, p-(ethylmercury(II)mercapto)-benzenesulfonate or ethylmercury(II)thiobenz-3,4-oxazole-1-carboxylic acid sodium.

13. Uric acid standard composition as claimed in claim 2 wherein said alkali metal azide is sodium azide.

14. Uric acid standard composition as claimed in claim 2 wherein said alkali metal azide is lithium azide.

15. Uric acid standard composition as claimed in claim 1 essentially consisting of 0.12 to 0.71 mM uric acid, 0.3 to 1.0 mM of lithium carbonate, 1.5 to 5.0 mM of complexing agent in 200 mM of buffer material.

16. Uric acid standard composition as claimed in claim 2 essentially consisting of 0.12 to 0.71 mM uric acid, 0.3 to 1.0 mM of lithium carbonate, 1.5 to 5.0 mM of alkali metal azide in 200 mM of buffer material.

17. Method of carrying out a quantitative determination of uric acid in biological fluids, which method comprises applying a conventional analytical technique to such biological fluid, and to a uric acid standard composition of known uric acid concentration as claimed in claim 1, and relating the value obtained when analyzing the standard solution as a correction factor to the value obtained when analyzing the unknown fluid.

* * * * *